(12) United States Patent
Miller et al.

(10) Patent No.: US 7,537,632 B2
(45) Date of Patent: May 26, 2009

(54) PANEL FILTER WITH FRAME

(75) Inventors: David Miller, Louisville, KY (US);
Mitch Reynolds, Campebellsville, KY (US)

(73) Assignee: Clarcor Air Filtration Products, Inc., Louisville, KY (US)

( * ) Notice: Subject to any disclaimer, the term of this patent is extended or adjusted under 35 U.S.C. 154(b) by 250 days.

(21) Appl. No.: 11/472,979

(22) Filed: Jun. 22, 2006

(65) Prior Publication Data

US 2007/0294988 A1    Dec. 27, 2007

(51) Int. Cl.
*B01D 46/00* (2006.01)
(52) U.S. Cl. .............................. 55/501; 55/497; 55/499; 55/511; 55/495; 55/DIG. 31
(58) Field of Classification Search ................... 55/495, 55/497, 499, 500, 501, DIG. 5, DIG. 31, 55/511; 210/493.1, 493.3, 495
See application file for complete search history.

(56) References Cited

U.S. PATENT DOCUMENTS

| | | | |
|---|---|---|---|
| 1,150,490 A | 8/1915 | Bingaman | |
| 2,562,590 A | 3/1947 | Viglietta | |
| 2,869,694 A | 6/1957 | Breckheimer | |
| 3,107,990 A | 4/1960 | Getzin | |
| 3,992,173 A | 11/1976 | Wharton et al. | |
| 4,086,071 A | 4/1978 | Champlin | |
| 4,323,379 A | 4/1982 | Shearin | |
| 4,372,763 A * | 2/1983 | Champlin et al. | ............. 55/501 |
| 4,561,587 A | 12/1985 | Wysocki | |
| 4,570,844 A | 2/1986 | Wysocki | |
| 5,782,944 A * | 7/1998 | Justice | ......................... 55/495 |
| 5,795,361 A | 8/1998 | Lanier, Jr. et al. | |
| 6,033,454 A | 3/2000 | Hoeffken | |
| 6,126,707 A * | 10/2000 | Pitzen | ......................... 55/495 |
| 6,159,318 A | 12/2000 | Choi | |
| 6,398,839 B2 | 6/2002 | Choi et al. | |
| 6,521,011 B1 * | 2/2003 | Sundet et al. | ................. 55/499 |
| 6,758,878 B2 | 7/2004 | Choi et al. | |
| 7,118,610 B2 * | 10/2006 | Lipner | ......................... 55/495 |
| 7,156,891 B2 * | 1/2007 | Winters et al. | ................ 55/497 |
| 7,255,723 B2 * | 8/2007 | Choi et al. | .................... 55/499 |
| 2003/0070406 A1 | 4/2003 | Duffy | |
| 2004/0112526 A1 | 6/2004 | Choi et al. | |
| 2004/0148915 A1 | 8/2004 | Lipner | |
| 2004/0182055 A1 | 9/2004 | Wynn | |

(Continued)

OTHER PUBLICATIONS

U.S. Appl. No. 11/156,811, filed Jun. 20, 2005, Clarcor Air Filtration Products, Inc.

*Primary Examiner*—Duane Smith
*Assistant Examiner*—Robert A Clemente
(74) *Attorney, Agent, or Firm*—Reinhart Boerner Van Deuren P.C.

(57) ABSTRACT

A panel filter frame and panel filter are provided. The panel filter frame is made from a one-piece die-cut blank of material. The die-cut blank includes a grill portion, four sidewall portions and four flap portions all integrally connected. Individual sidewall portions are interposed between a side of the grill portion and one of the four flap portions. The plurality of portions of the die-cut blank are interconnected at fold lines. The frame is formed when the die-cut blank is folded about the fold lines and the portions are secured in the folded position by at least a plurality of interlock receptacles formed in the terminating folded portion of the die-cut blank.

22 Claims, 9 Drawing Sheets

U.S. PATENT DOCUMENTS

2006/0053759 A1    3/2006  Winters et al.
2007/0204574 A1 *  9/2007  Workman ................... 55/495
2007/0289273 A1 *  12/2007 Boyd ......................... 55/497

* cited by examiner

PANEL FILTER WITH FRAME

FIELD OF THE INVENTION

This invention generally relates to air filters, and more particularly to panel air filters.

BACKGROUND OF THE INVENTION

Panel air filters are generally used for filtering air in forced air systems such as furnaces and ventilation systems. Panel air filters generally comprise a panel of filter media surrounded and supported by a paperboard frame. One common type of filter media used in panel filters is pleated filter media that includes a plurality of peaks and valleys. In most prior art implementations, pleated filter media have used a semi-rigid support structure other than the frame to maintain the shape of the peaks and valleys and prevent the pleats from collapsing or becoming misshapen. For example, triangular shaped wedges interposed between the pleats have been used. Alternatively, the support structure might include a wire mesh often referred to as a scrim that is copleated with the pleats and has memory that retains its shape and increase the rigidity and support of the pleats.

Self supported panel filters are also known, in which the pleated filter media retains it shape and is supported without a scrim or intermittent wedge (e.g. by the paperboard frame itself). For example, the present assignee makes and sells a pleated panel filter sold under the mark X-treme and covered by pending U.S. patent application Ser. No. 11/156,811, filed on Jun. 20, 2005, the entire disclosure of which is hereby incorporated herein by reference thereto. While not limited thereto, the present invention provides an improvement over this design.

Frames for the panel filters are usually formed from one or multiple pieces of folded and adhesively bonded pieces of paperboard. Unfortunately, during manufacturing while the adhesive is curing, the folded panels of the frame tend to relax which can affect the shape and structural strength of the finished frame. While there are attempts to interlock the folded panels of the frame, these attempts have complexities, result in extra manufacturing cost or inefficiency, and/or are not applicable to one piece die cut frames. Such prior designs are also more complex than necessary and unnecessarily use more material than is required to prevent the folded panels from shifting while the adhesive cures.

There are various examples in the prior art relating to the frame teachings of panel filters. One such example is U.S. Pat. No. 4,561,587 to Wysocki. The '587 patent teaches a one piece paperboard frame having a plurality of foldable panels that are interconnected at fold lines. However, the '587 patent requires a complex shape that uses numerous unnecessary panels, which increases the amount of material required for the blank of paperboard and the amount of time for assembling the frame member. Furthermore, another example of a one-piece paperboard blank that can be folded into a panel filter frame includes U.S. Pat. No. 4,570,844 also to Wysocki. The '844 patent includes four separate foldable panels on each side of a main panel all interconnected at fold lines. The foldable panels on adjacent sides of the main panel are interconnected to secure the frame in a folded position. However, by using four panels on each side, when the panels are folded, they provide duplication of panels that extend substantially perpendicular to the main panel. This configuration further uses increased amount of material and makes the design complex. Additionally, another example of a paperboard panel filter frame includes U.S. Pat. No. 4,323,379 to Shearin. The frame in Shearin provides a substantially elongated strip that wraps around the perimeter of a piece of filter media and does not pertain to a one piece die cut including an integral grill or main panel that extends across the surface of the filter media.

There exists, therefore, a need in the art for an improved one-piece panel filter frame and panel filter that is simple in design, easily manufactured and uses a minimum of material and foldable flaps while providing interlocking panels. Furthermore, there exists a need in the art for a pleated panel filter with an improved frame in which the pleated filter media is self supporting without the use of additional rigid material or interposed support members, further reducing the complexity of the panel filter.

BRIEF SUMMARY OF THE INVENTION

The present invention is directed toward a simplified panel filter frame that includes an interlocking feature that keeps the frame assembled during manufacture and that is particularly applicable but not limited to one-piece die cut frames and self supporting media applications. The interlock feature may be provided at the respective overlapping portions of adjacent terminating end flaps and can take a variety of different forms as indicated but not limited to the examples herein. Unlike several examples of the prior art, the invention may be accomplished with minimal modification and with little or no additional frame material necessary. Another subsidiary feature of the present invention is directed toward one or more slits in one or more of the flaps as forming the corner interlock feature. The slit can be ready struck into the terminating flaps with minimal die changes and with removing little or no paperboard material such that the slit edges may even contact each other in the unassembled state. The slit can receive the edge of an adjacent flap during assembly to hold the flaps together while the adhesive between overlapping portions of flaps is curing.

According to one aspect, the panel filter frame comprises a one-piece die-cut blank. The die-cut blank includes a rectangular face panel, four sidewall panels, and four flaps. The face panel has four sides. Individual sides of the four sidewall panels are connected to individual sides of the face panel along first fold lines. The four flaps are individually connected to one of the sidewall panels along second fold lines. Each flap has a terminating edge on an opposite side as the second fold line for that flap. Furthermore, at least one of the flaps has an end lock structure arranged to mechanically interlock the at least one flap with another adjacent flap when the panel filter frame is folded along the fold lines.

In yet another inventive aspect, a panel filter frame comprises a one-piece die-cut blank of material that includes a rectangular main panel and four foldable panels. Each of the foldable panels connect to a different side of the rectangular main panel and include a sidewall portion and a terminating flap portion. The sidewall portion and terminating flap portions of respective foldable panels are interconnected at first fold lines. The foldable panels are connected to the sides of the rectangular main panel at second fold lines. The first and second fold lines of respective foldable panels extend in generally parallel relation to the sides of the rectangular main panel. The terminating flap portions substantially define the outermost boundaries of the die-cut blank in an unfolded condition. In a folded condition, the terminating flap portions are generally parallel to and spaced apart from the main panel, and the side wall portions extend generally perpendicularly between the main panel and the flap portions. At least one of the terminating flap portions includes an engagement receptacle formed in an overlapping end portion thereof for engaging a corresponding overlapping end portion of an adjacent one of the terminating flap portions.

Another aspect of the present invention is directed toward a panel filter having self supported pleated filter media and an improved frame formed from a one-piece die-cut sheet having a grill, four sidewall panels, four flaps, wherein the flaps overlap and interlock each other at end portions thereof. The grill has four sides and includes a plurality of air passage holes that are defined by webbing. The four sidewall panels are connected on the sides of the grill along first fold lines. Each of the four flaps are connected to one of the sidewall panels along second fold lines. Each flap has a terminating edge on an opposite side as the second fold line. Furthermore, at least one of the flaps includes a corner lock structure formed in an end portion of the flap for mechanically interlocking the flap with another adjacent flap when the one-piece die-cut sheet is folded along the fold lines forming the frame. The end portions of the adjacent flaps overlapping one another. In a folded and secured condition, the grill, flaps and panels defining a continuous channel receiving edges of the filter media. Furthermore, the filter media is adhesively secured within the frame and has a plurality of the peaks of the pleats adhesively bonded to a face of the webbing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
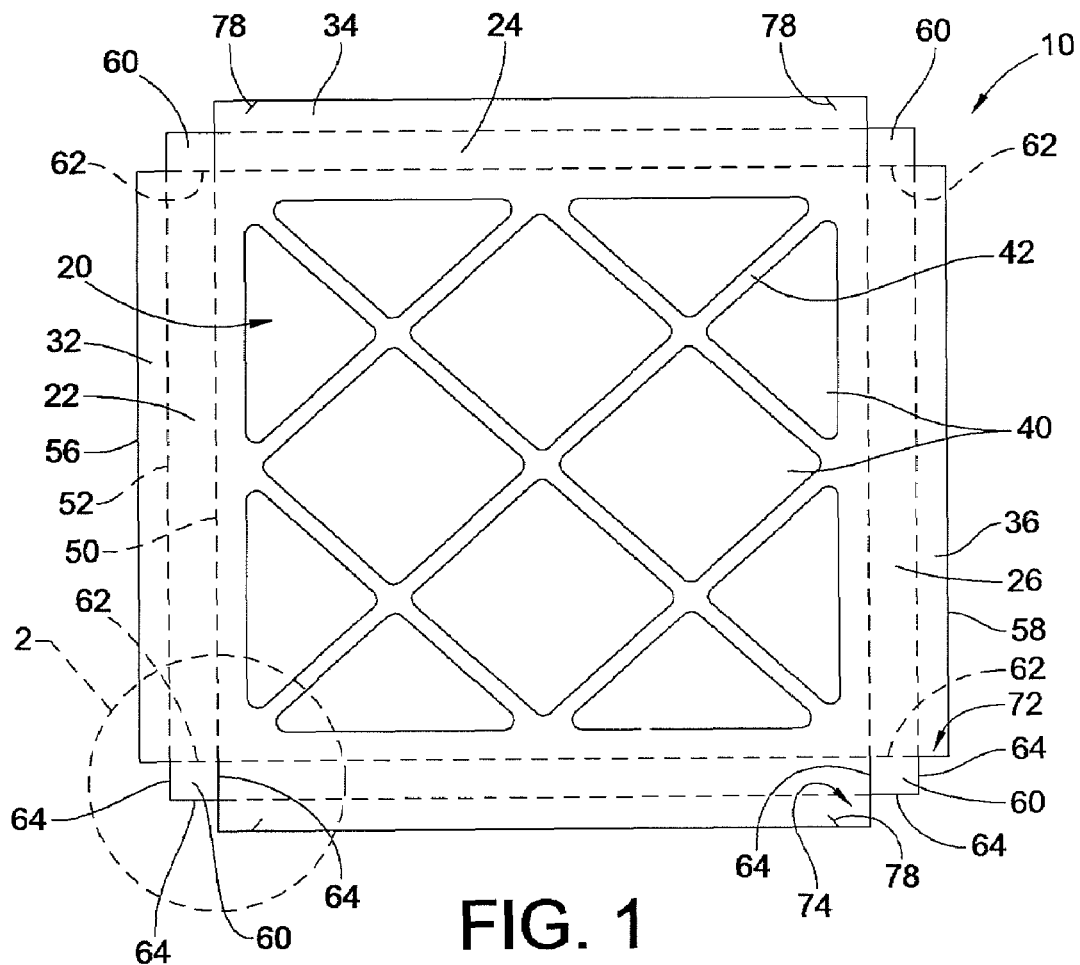
FIG. 1 is a plan view illustration of a first embodiment of a die-cut blank that can be folded and bonded to form a panel filter frame in accordance with the teachings of the present invention.
Figure 17:
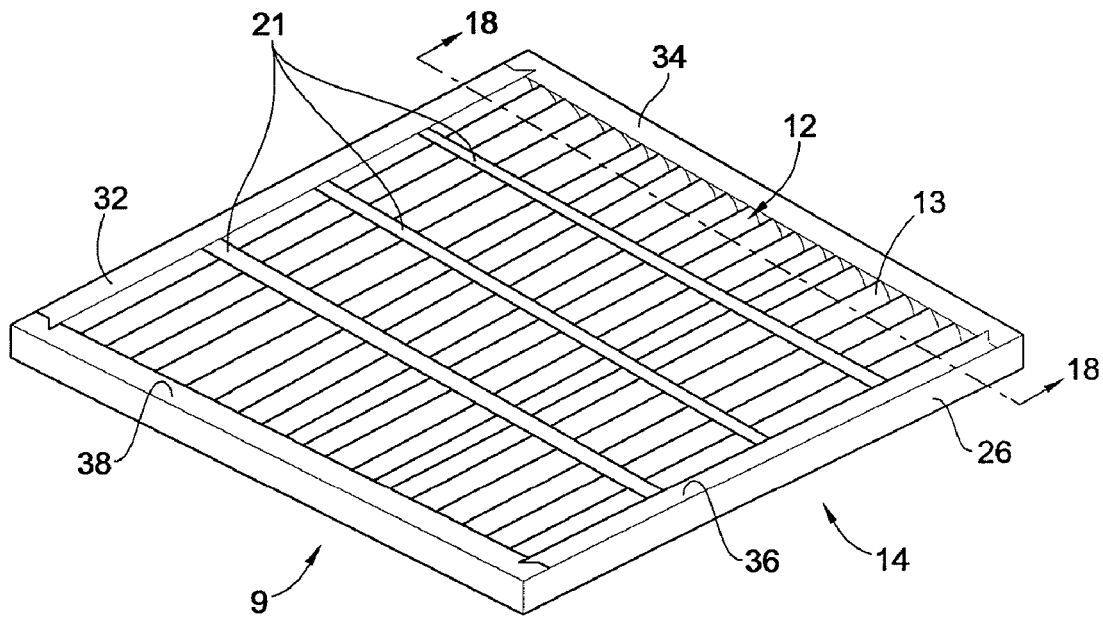
FIG. 17 is a perspective illustration of a panel filter having a frame according to the embodiment of FIG. 1, the panel filter having a pleated filter media secured within the panel filter frame.
Figure 18:
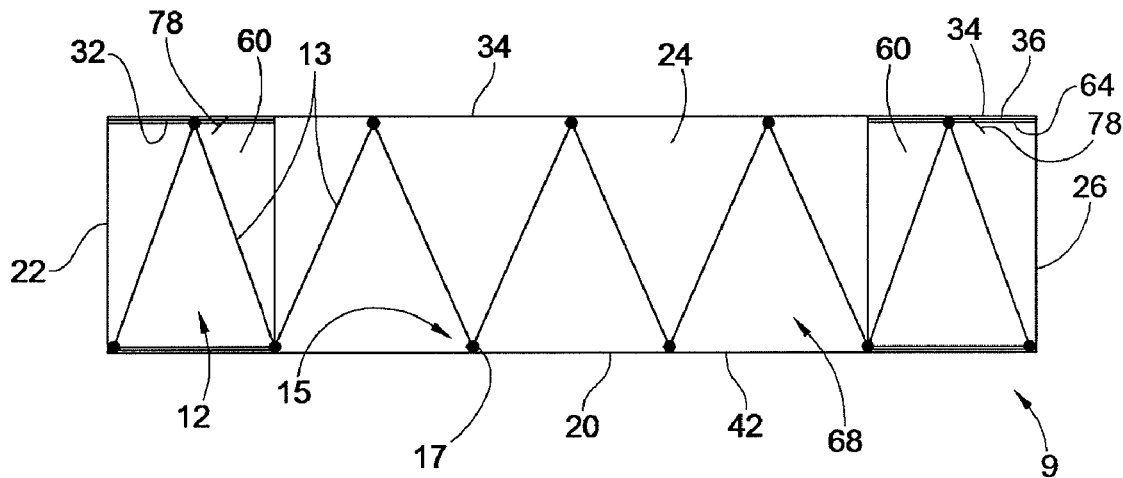
FIG. 18 is a cross-sectional illustration of the panel filter of FIG. 17 taken about line 18-18 illustrating the filter media secured within the frame.

Turning now to the figures, FIG. 1 illustrates an exemplary embodiment of a one-piece die-cut blank 10 that when operably folded forms a panel filter frame 14 (see FIG. 3) for supporting a similarly shaped piece of pleated filter media 12 (see FIGS. 17 and 18). The die-cut blank 10 of FIG. 1 generally includes a substantially rectangular grill portion 20, four sidewall portions 22, 24, 26, 28 and four flap portions 32, 34, 36, 38, all integrally formed from a unitary sheet of material. Prior to folding the die-cut blank 10 to form the frame 14, the die-cut blank 10 is substantially planer and can be manufactured from paperboard, card board, corrugated board, kraft, thin plastic sheet and the like. It is preferable, but not required, that the material is a multi-ply material having at least one layer that provides an aesthetically pleasing visual appearance and feel and that can be printed with trademarks, advertising and product information. Paperboard is often typical and preferable for such panel filters. Preferably, this layer is a laminate or other coating forming the outer surface of the material that provides a smooth surface. However, the smooth surface should be appropriate for or compatible with standard printing techniques. The opposite side of the material is preferably adapted to receive and bond with adhesive.

The grill portion 20 includes a plurality of holes 40 that allow air to pass through the grill portion 20 when the die-cut blank 10 is folded to form the panel filter frame 14 with the filter media 12 secured therein. The ribs or webbing 42 providing the holes 40 function to help support the pleated shape of the filter media 12, as seen in FIG. 18. Specifically, the tips or peaks 15 of the pleats 13 are adhesively bonded by glue 17 or other bonding techniques to the webbing 42. By bonding the pleats to the grill portion 20, the pleats 13 are prevented from being damaged, crushed, or misshapen. The grill portion 20 also supports the filter media during use when air is flowing through the media and a pressure differential (albeit slight in typical application) is induced across the media. Preferably, the opposite peaks of the pleats 13 may be adhesively bonded to the inner side of the flap portion 34. Not only are the peaks of the pleats 13 bonded to either the grill portion 20 or the flap portions 32-38, the terminating edges and ends of the pleats 13 and/or filter media 12 are also bonded to the sidewall portions 22-28 to seal the filter media 12 within the frame 14. This configuration prevents the fluid that passes through the filter panel 9 from short circuiting or bypassing the filter media 12.

Returning to FIG. 1, the holes 40 are illustrated as a plurality of rectangles and triangles however other shaped holes may be used, such as circles, ovals, diamonds and the like. Furthermore, rather than extending at a diagonal relative to the sidewalls 22-28 and flap portions 32-38, the webbing 42 may extend perpendicular and/or parallel thereto.

Each sidewall portion 22-28 integrally and foldably connects to one side of the grill portion 20 as well as to one side of one of the four flap portions 32-38. As such, the sidewall portions 22-28 are consequently interposed the grill portion 20 and the flap portions. All of the sidewall portions 22-28 are similar to one another and all of the flap portions are similar to one another and will be first described generally with reference to sidewall portion 22 and its corresponding integrally connected flap portion 32.

Figure 3:
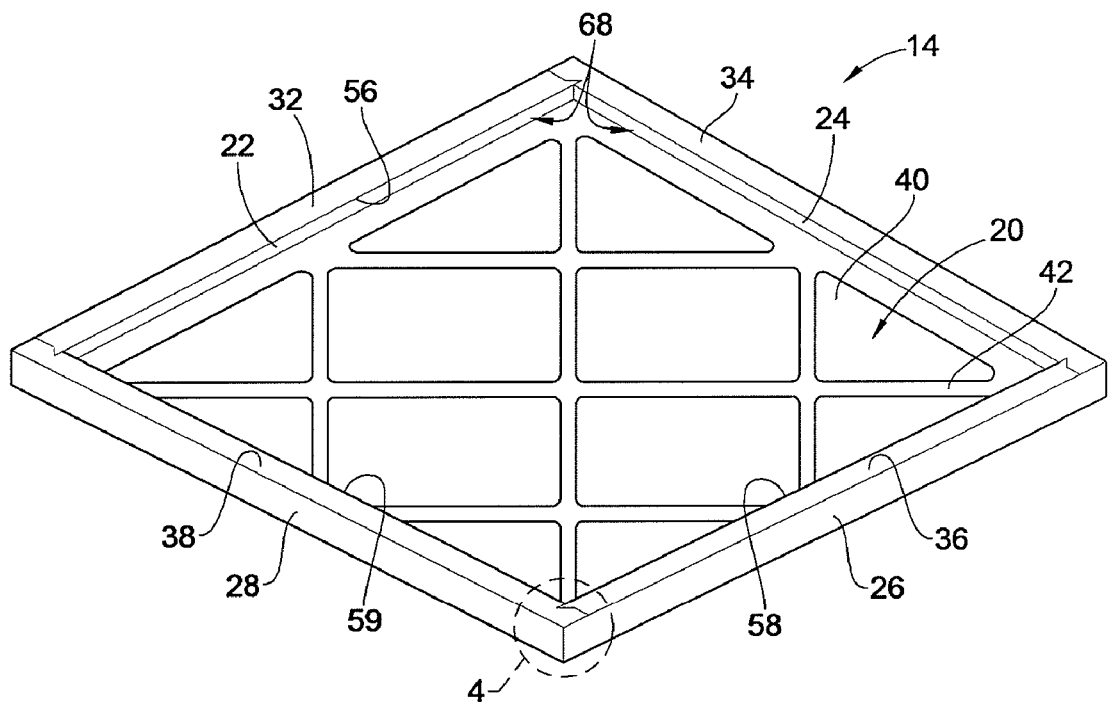
FIG. 3 is a perspective illustration of the die-cut blank of FIG. 1 folded about fold lines such that the die-cut blank forms a panel filter frame illustrating one embodiment of the interlocking receptacles.

Sidewall portion 22 connects to one of the elongated sides of the grill portion 20 at a first fold line 50 and to the flap portion 32 at a second fold line 52. For purposes of reference, fold lines are illustrated using dashed lines when in an unfolded condition. The fold lines 50, 52 function as integral hinges when the die-cut blank 14 is operably folded to form the frame 14, as shown in FIG. 3. Preferably, fold lines are established by scoring lines and/or creasing lines and/or at scoring line and creasing line locations. Actual scoring and/or creasing facilitates easy and accurate folding. Scoring may include perforations, discontinuous cut scoring, press scoring, die scoring, binder scoring, thermal scoring, roller scoring, and the like. Furthermore, the scoring may extend the entire length or only a partial length of the fold lines as well as entirely through the thickness of the die-cut blank. Any of these methods or other such method can produce the fold lines. The sidewall portion 22 and its corresponding flap portion 32 are substantially rectangular and extend along the side of the grill portion 20 in generally parallel relation.

The flap portion 32 includes a terminating edge 56 that extends parallel to the first and second fold lines 50, 52. This terminating edge 56 provides a portion of the terminating edge or side of the die-cut blank 14. As such, in an embodiment, the flap portion 32 is the terminating folded member of the folded frame 14.

With reference to FIG. 1, two sidewall portions 22, 26 positioned on opposite sides of the grill portion 20 include sidewall overlap portions 60. The sidewall overlap portions 60 are foldably connected to opposite ends of the sidewall portions 22, 26 with third fold lines 62. The sidewall overlap portions 60 are generally rectangular in shape and include three free edges 64. In the illustrated embodiment, the other two sidewall portions 24, 28 do not include sidewall overlap portions. However in an embodiment, each sidewall portion may include overlap portions at ends thereof or no overlap portions at all.

With reference to FIGS. 1-4, the die-cut blank 10 (FIG. 1) can be folded along the fold lines 50, 52, 62 to form the panel filter frame 14 (FIG. 3) for holding and supporting a similarly shaped filter media 12 (see FIG. 17). When the die-cut blank 10 is operably folded to form the panel filter frame 14, the sidewall portions 22-28 extend substantially perpendicularly relative to the grill portion 20, the flap portions 32-38, and one another. In this configuration, the flap portions 32-38 are spaced apart from the grill portion 20 forming a channel 68 therebetween. The channel 68 is adapted to and sized to receive the filter media 12 (see FIG. 18). In the illustrated embodiment, the channel 68 is continuous as is it surrounds the grill portion 20.

Typically, the width of the channel 68, substantially determined by the width of the sidewall portions 22-28, is closely sized to the thickness of an inserted piece of filter media and more particularly is usually equal to or slightly less than the thickness of an inserted piece of filter media 12. The size of the channel 68 is equal to or less than the thickness of the filter media 12 because the inner surfaces of the channel 68 are typically coated with an adhesive to secure the filter media 12 therein. Furthermore, adhesive is applied to the inner surface of the webbing 42 to further secure the filter media 12 to the panel filter frame 14. Typically, the adhesive contacts the tips 15 of the pleated filter media 12. The adhesive may be any suitable adhesive material and may include thermo-bonding.

Figure 4:
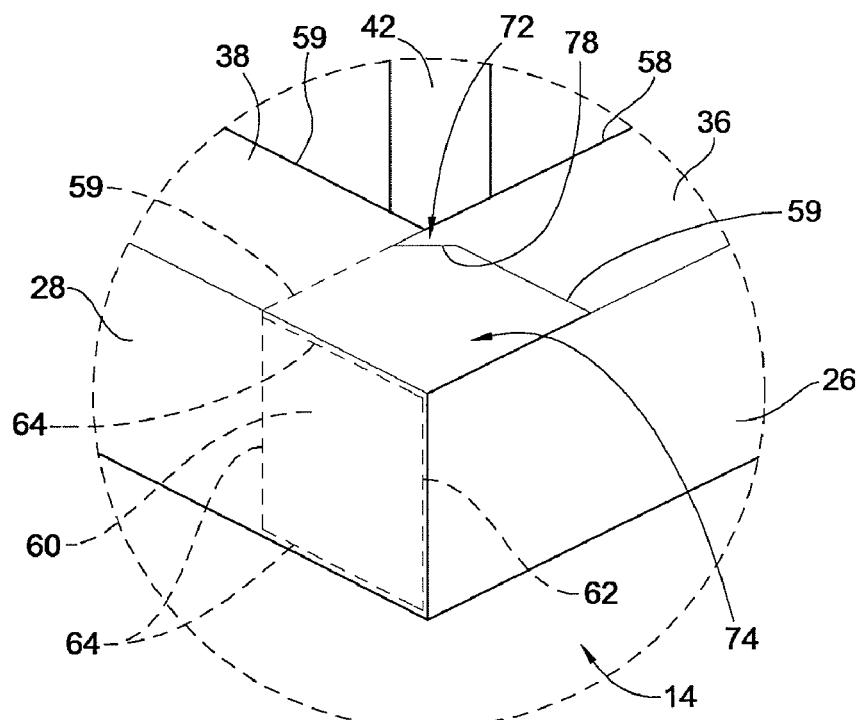
FIG. 4 is a partial perspective view of a corner of the panel filter frame of FIG. 3 illustrating adjacent flap portions being interconnected.
Figure 5:
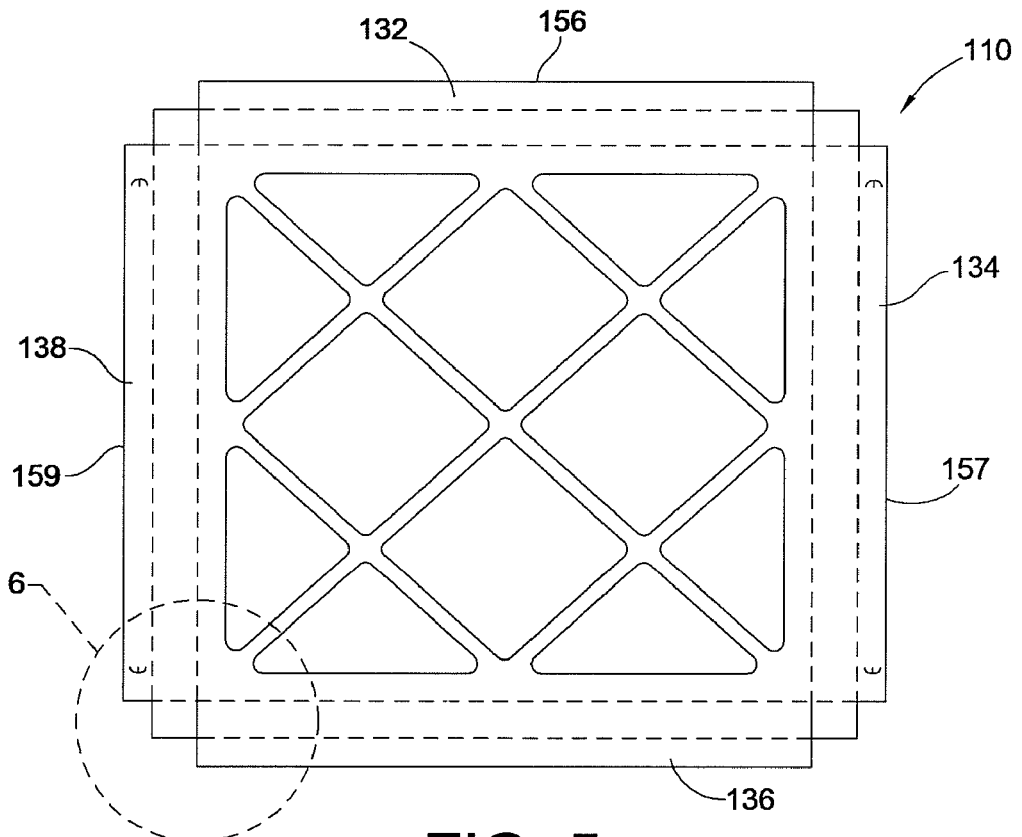
FIG. 5 is a plan view illustration of another embodiment of a die-cut blank that can be folded and bonded to form a panel filter frame in accordance with the teachings of the present invention.
Figure 6:
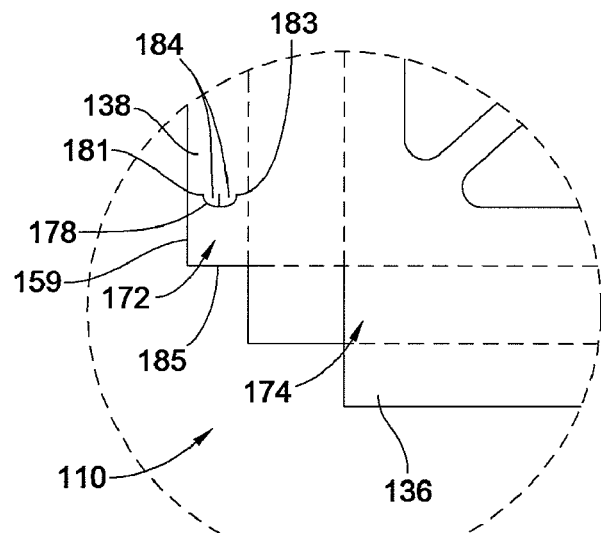
FIG. 6 is an enlarged partial illustration of a corner of the die-cut blank in FIG. 5.

As best illustrated in the partial illustration of FIG. 4, the overlap portion 60 of one sidewall portion 26 overlaps a portion of the end of an adjacent sidewall portion 28 (the overlapping condition is illustrated by the overlap portion 60 being illustrated as hidden dashed lines). Preferably, the overlap portion 60 and the adjacent sidewall portion 28 are ultimately adhesively bonded together to secure the two sidewall portions 26, 28 together. Furthermore, the end portions 72, 74 of adjacent flap portions 36, 38, respectively, similarly overlap as is illustrated by dashed lines. It is preferable that the overlapping end portions 72, 74 of the adjacent flap portions 36, 38 are adhesively bonded to further secure the structures and increase the rigidity of the panel filter frame 14.

Figure 2:
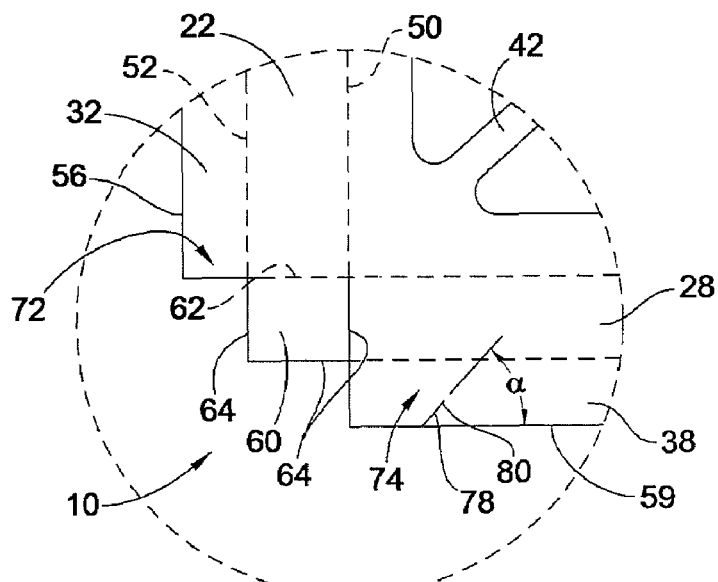
FIG. 2 is an enlarged partial illustration of a corner of the die-cut blank in FIG. 1.

As can be seen in FIG. 1 and more clearly in FIG. 2, flap portion 38 includes a pair of slits 78 extending into end portions 74 of flap portion 38. The slits 78 extend from the terminating free edge 59 of flap portion 38 toward the second fold line 52 at an angle α relative to the free edge 59. Particularly, the end of the slit 78 that intersects the free edge 59 is positioned closer to the end of the flap portion 38 and the terminating end 80 of the slit 78 is positioned farther from the end of the flap portion 38. Furthermore, the slit 78 is at least partially positioned in the end portion 74 of the flap portion 38. In an embodiment, the angle α is between about 25 degrees and 75 degrees and is preferably about 45 degrees. Furthermore, in an embodiment, the slit 78 is between about 0.15 inches and about 0.5 inches in length.

As shown in FIGS. 3 and 4, with the die-cut blank 10 in the folded position forming a frame 14, the slit 78 of flap portion 38 functions as a flap receptacle by engaging and receiving the free edge 58 of an adjacent flap portion 36. More particularly, in the folded position, the end portion 74 of flap portion 38 is the portion of the flap portion 38 that generally overlaps the end portion 72 of the adjacent flap portion 36. With the two end portions 72, 74 overlapping, the free edge 58 of the adjacent flap portion 36 is secured within the slit 78. Specifically, the end portion 72 of the adjacent flap portion 36 is positioned such that some of flap portion 38 is positioned on each side of the adjacent flap portion 36. As such, with the adjacent flap portion 36 inserted into the slit 78, a portion of the free edge 58 of the end portion 72 is hidden and a portion of the free edge 58 is exposed. This configuration interlocks the two flap portions 36, 38 together and thereby increases the structural strength and rigidity of the frame.

In the illustrated embodiment, flap portions 34, 38 on opposite sides of the grill portion 20 each include slits 78 proximate opposite ends of the flap portions 34, 38 while the other two flap portions 32, 36 do not have any slits and are substantially continuous or solid. As such, the flap portions 34, 38 that include slits 78 receivingly engage the other two flap portions 32, 36 at opposite ends thereof. However, in an embodiment each flap portion could include a single slit and engage a single adjacent flap portion while being similarly engaged by another adjacent flap portion. Or alternatively, the slits could be in flap portions 32, 36. In FIGS. 3 and 4, flap portions 34, 38 that include the slits 78 are positioned above the flap portions 32, 36 that they engage. However, the overlapping configuration could be reversed such that flap portions 32, 36, without the slits, overlap flap portions 34, 38. As such, the portions of flap portions 34, 38 that were previously below flap portions 32, 36 would consequently be above flap portions 32, 36 and vice versa.

The mechanical interlocking feature of the slits 78 further facilitates manufacture by securing the flap portions 32-38 proximate one another while the adhesive layer between the overlapping ends of the flap portions 32-38 and sidewall portions 22-28 cures. This interlocking configuration is very cost effective as the slit 78 is very easy to manufacture during the die-cutting process.

Figure 7:
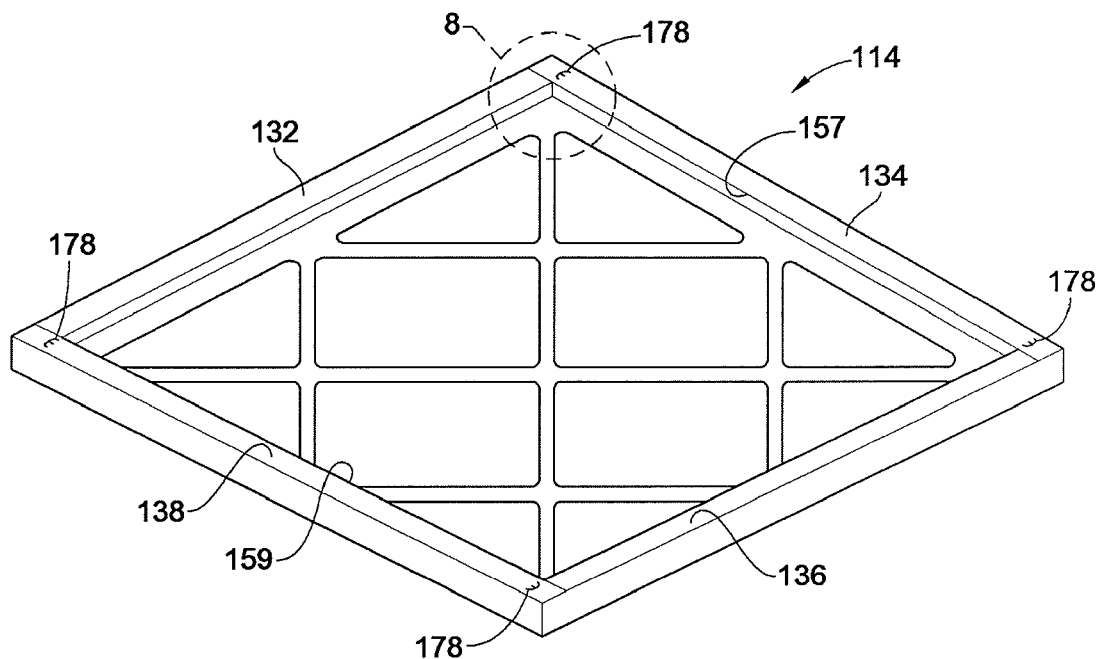
FIG. 7 is a perspective illustration of the die-cut blank of FIG. 5 folded about fold lines such that the die-cut blank forms a panel filter frame.
Figure 8:
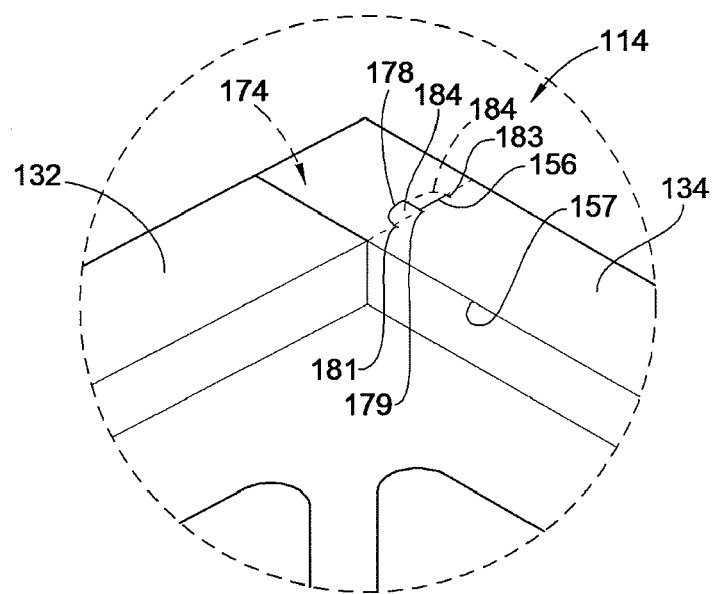
FIG. 8 is a partial perspective view of a corner of the panel filter frame of FIG. 7 illustrating the adjacent flap portions being interconnected.
Figure 9:
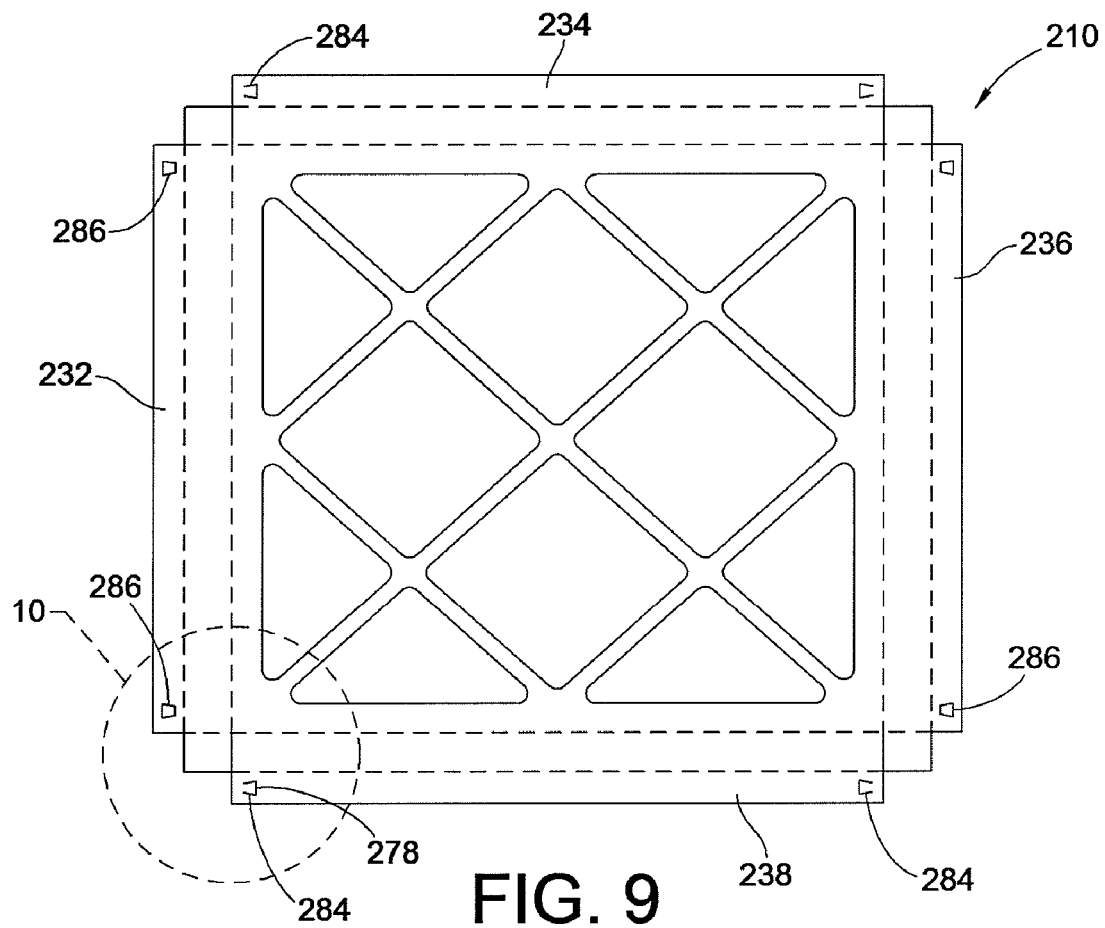
FIG. 9 is a plan view illustration of another embodiment of a die-cut blank that can be folded and bonded to form a panel filter frame in accordance with the teachings of the present invention.
Figure 10:
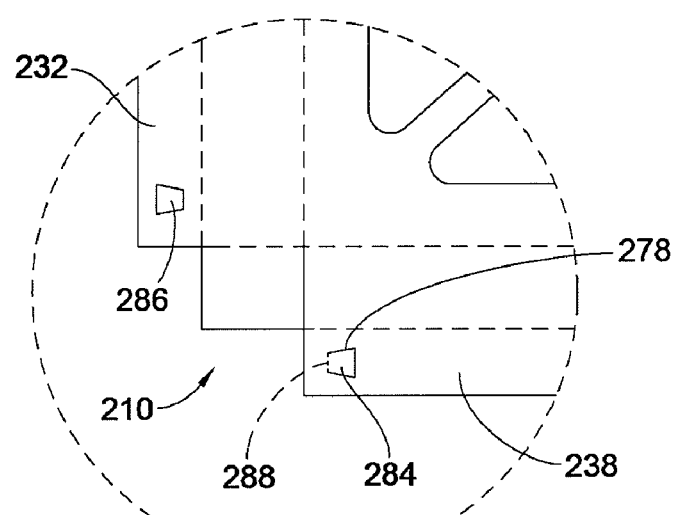
FIG. 10 is an enlarged partial illustration of a corner of the die-cut blank in FIG. 9.
Figure 11:
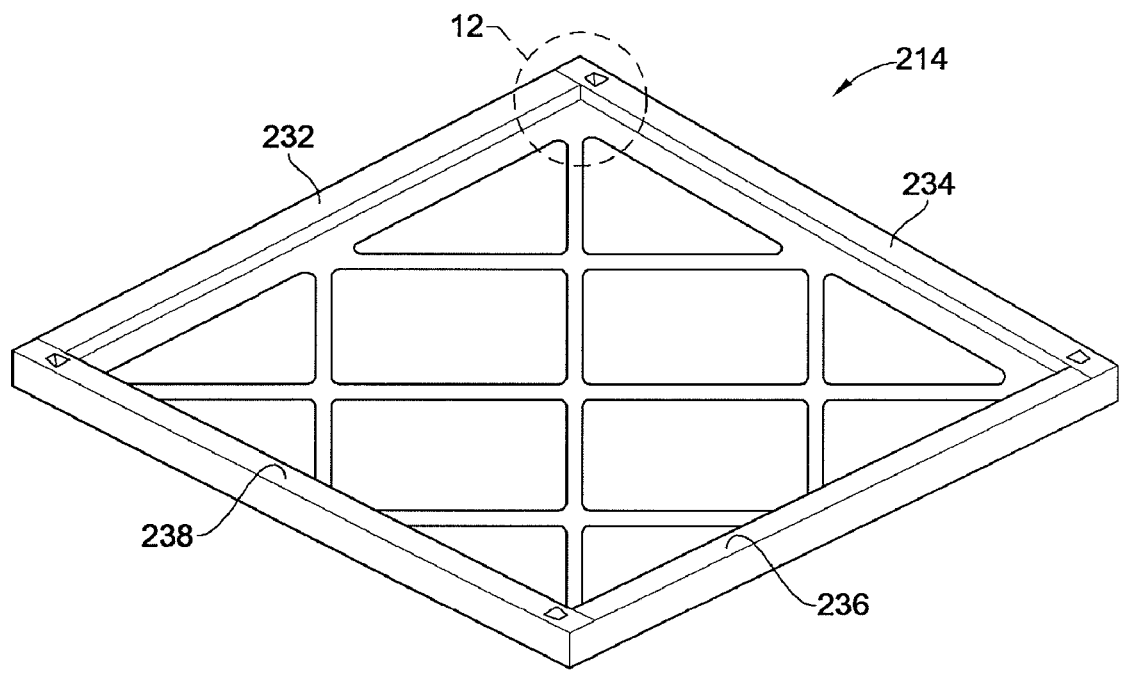
FIG. 11 is a perspective illustration of the die-cut blank of FIG. 9 folded about fold lines such that the die-cut blank forms a panel filter frame.

FIGS. 5-8 illustrate another embodiment of the invention that is similar to the previous embodiment. As such, only those features and structures that are different from the previous embodiment will be described. In this embodiment, the interlocking structures employ slits 178 formed in flap portions 134, 138 of the die-cut blank 10. However, the slits 178 in this embodiment do not intersect the free edges 157, 159 of the flap portions 134, 138 in which the slits are formed. Instead, as best illustrated in FIG. 8, the slits 178 are generally arcuate in shape and begin at a first end 181 and extend to a second end 183 and include legs that extend parallel with the free edges 157, 159. In the illustrated embodiment, a second slit portion 179 extends substantially transverse to and generally bisects the arcuate slit 178. Furthermore, as the arcuate slit 178 extends toward the end 185 of the flap portion 134 in which the slit 178 is formed, the arcuate or non-linear shape of the slit 178 forms a pair of tabbed portions 184. The slit 178 is not required to be arcuate in shape as long as the slit defines a flexible tab.

When the die-cut blank 110 is folded to form the panel filter frame 114 (see FIG. 7), the slits 178 function as interlocking receptacles. With particular reference to FIG. 8, with the end portion 172 of flap portion 134 folded over the end portion 174 of the adjacent flap portion 132, the free edge 156 of the adjacent flap portion 132 is received within the slit 178 and interposed between the outer surface of one of the tabbed portions 184 and the inner surface of the rest of end portion 172 of flap portion 134. As best illustrated in FIG. 7, flap portions 134, 138 on opposite sides of the grill portion 120 each include two slits 178 on opposite ends thereof for engaging the free edges 156, 158 of adjacent flap portions 132, 136 to completely interlock and secure the panel filter frame 114 in the folded position. Again, an adhesive is preferably used to further secure the portions of the panel filter frame 114 in the folded position. Furthermore, the slits 178 and corresponding tabs 184 could be disposed such that each flap portion includes only a single slit 178. Additionally, the pair of tabs 184 does not need to be provided individually and could alternatively be a single, non-bisected tab.

FIGS. 9-12 illustrate a further alternative embodiment of a die-cut blank 210 for forming a panel filter frame 214 according to the teachings of the present invention. In this embodiment, the interlocking structure includes apertures 286 in opposite flap portions 232, 236 and corresponding foldable tabs 284 in overlapping adjacent flap portions 234, 238. In this embodiment, the apertures 286 are trapezoidal in shape and more particularly, regular trapezoidal in shape. The tabs 284 are similarly shaped and positioned such that the tabs 284 may be folded into corresponding apertures 286 of adjacent flap portions thereby interlocking the two adjacent flap portions together. Each tab 284 is formed by a three sided slit 278 in the flap portions 234, 238. The fourth side of the tab 284 is provided by a fold line 288. The fold line side is shorter in length than the opposite side of the tab 284 to provide the trapezoidal shape that increases the securing action of the tab 284 when folded into the aperture 286.

Figure 12:
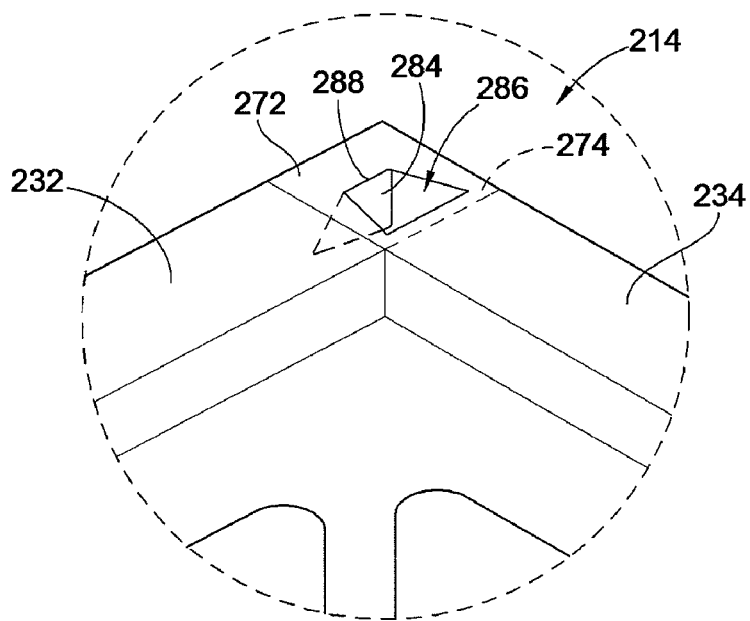
FIG. 12 is a partial perspective view of a corner of the panel filter frame of FIG. 11 illustrating adjacent flap portions being interconnected.

As illustrated in FIG. 12, with the end portion 272 of flap portion 234 having the tab 284 provided therein overlapping the end portion 274 of the adjacent flap portion 232 having the aperture 286 formed therein, the two similarly trapezoidal shaped structures overlap. When the tab 284 is folded into the aperture 286 about fold line 288, which functions as a hinge, the longer side of the trapezoidal tab 284 is inserted into the aperture 286. With the longer side positioned within the aperture 286, the tapered shape of the tab 284 creates an interference fit such that the tab 284 cannot be removed from the aperture 286 without first pivoting about the fold line 288. Thus, the corresponding apertures 286 and corresponding tabs 284 positioned within end portions of adjacent flap portions interlock adjacent flap portions. Each flap portion 232, 238 could include an aperture and a tab rather than two tabs or two apertures. Furthermore, alternative shapes could be used such as rounded, rectangular and the like.

Figure 13:
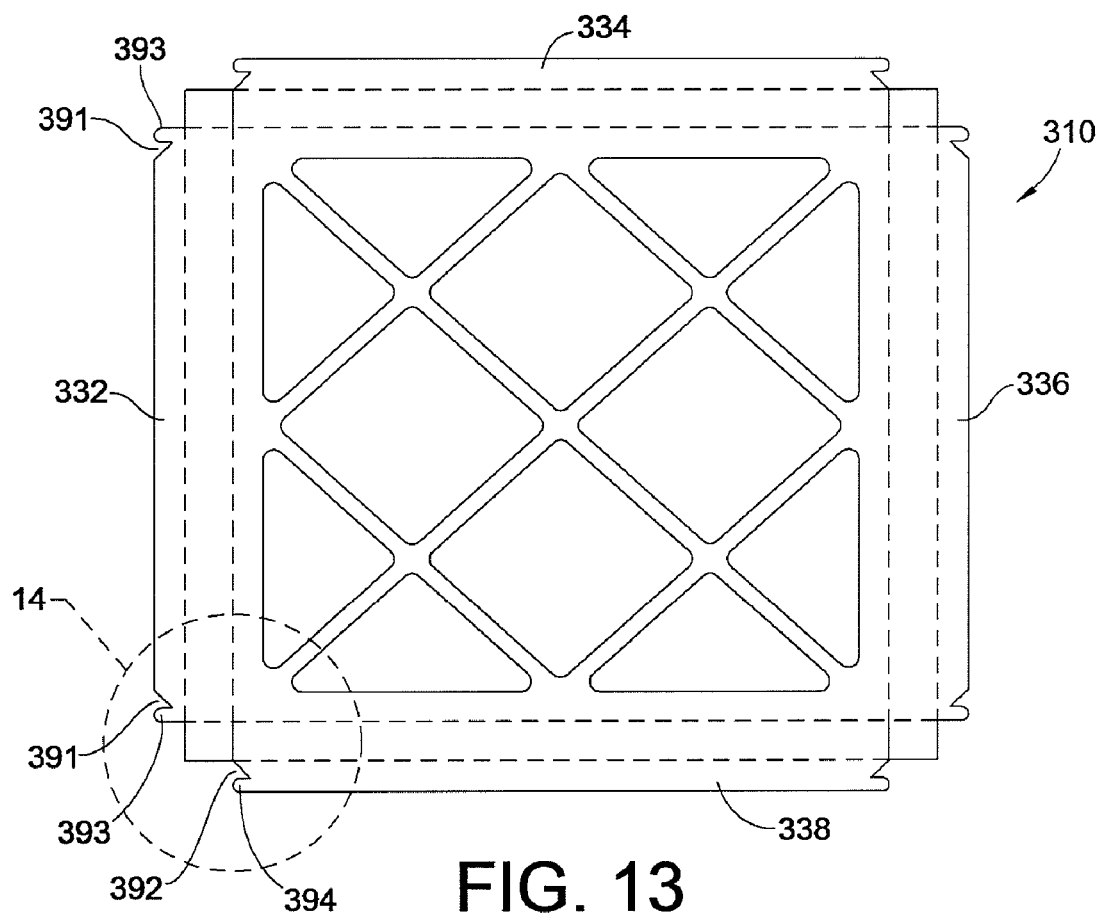
FIG. 13 is a plan view illustration of another embodiment of a die-cut blank that can be folded and bonded to form a panel filter frame in accordance with the teachings of the present invention.
Figure 14:
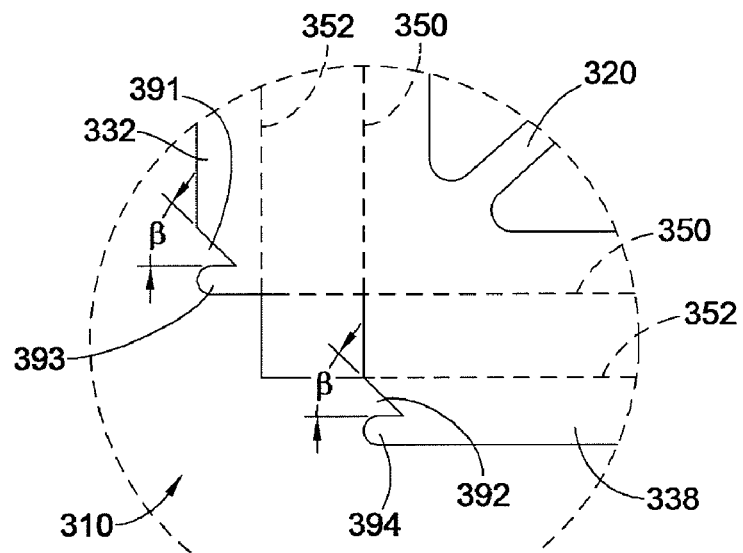
FIG. 14 is an enlarged partial illustration of a corner of the die-cut blank in FIG. 13.
Figure 15:
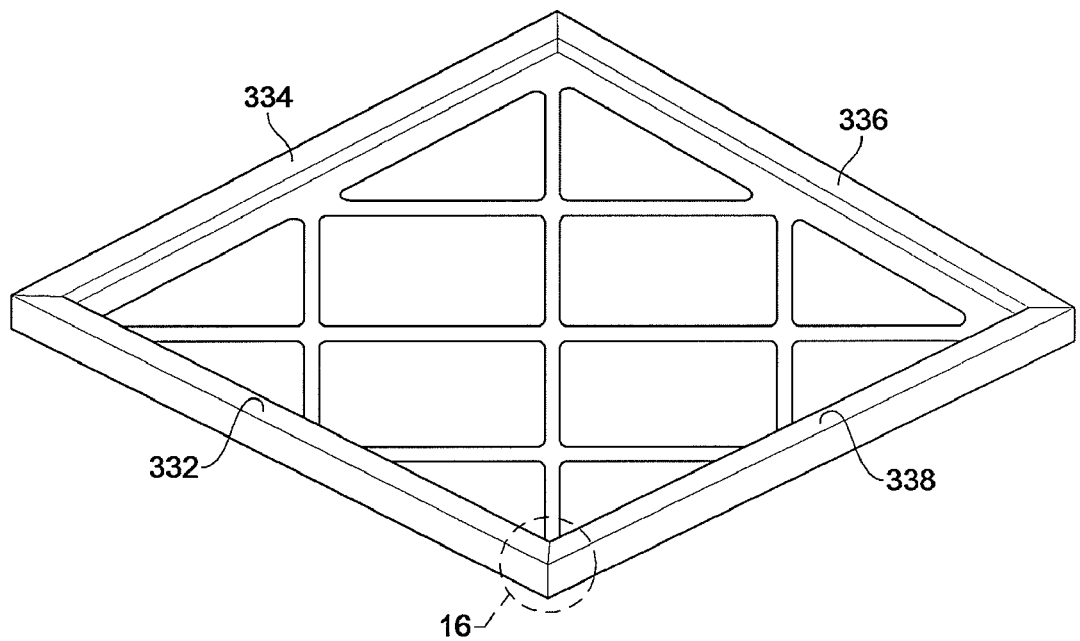
FIG. 15 is a perspective illustration of the die-cut blank of FIG. 13 folded about fold lines such that the die-cut blank forms a panel filter frame.
Figure 16:
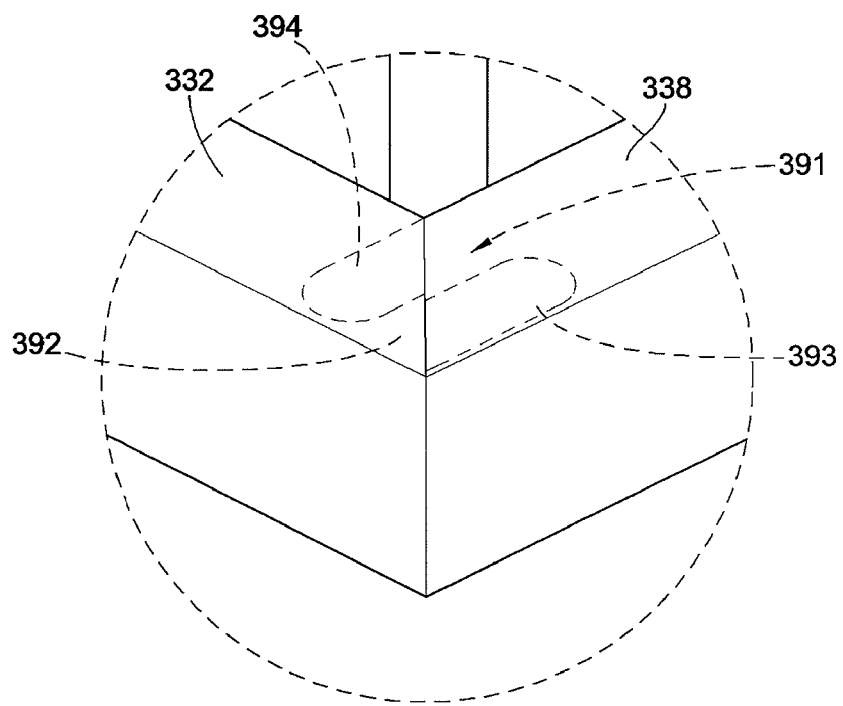
FIG. 16 is a partial perspective view of a corner of the panel filter frame of FIG. 15 illustrating adjacent flap portions being interconnected.

FIGS. 13-16 illustrate a further embodiment of a die-cut blank 310 foldable into a panel filter frame 314 according to the teachings of the present invention. FIGS. 13 and 14 illustrate the unfolded die-cut blank 310 while FIGS. 15 and 16 illustrate the die-cut blank folded into the panel filter frame 314. In this embodiment, each of the adjacent flap portions 332-336 include either interlocking notches 391 or interlocking notches 392 that establish rounded tabs 393, 394 respectively. The interlocking notches 391, 392 are substantially similar and are substantially triangularly shaped. The tabs 393, 394 that each interlocking notch 391, 392 establishes, respectively, extend generally parallel relative to each other. As such, interlocking tab 393 extends substantially perpendicular to fold lines 350, 352 connecting the flap portion 332 that integrally forms tab 393. Tab 394 extends substantially parallel to the fold lines 350, 352 connecting the flap portion 338 that integrally forms tab 394 to the grill portion 320.

As best illustrated with reference to FIG. 16, the notch portions 391, 392 of the two adjacent flap portions 332, 338 engage and interlock with each other to secure the two adjacent flap portions 332, 338 to one another. As illustrated in FIG. 14, the notch portions 391, 392 are formed by die-cut edges that extend relative to each other at an angle β. Preferably, this angle β is about 45 degrees. Furthermore, in the illustrated embodiment one edge of notch 391 extends substantially perpendicular to fold line 352 that connects the flap portion 332 to the sidewall portion 322. And one edge of notch 392 extends substantially parallel to fold line 352 that connects flap portion 338 to the sidewall portion 328. This parallel and perpendicular orientation allows the tabs 393, 394 and notches 391, 392 of adjacent flap portions to easily engage and interlace to secure the panel filter frame 314 in the folded position. To facilitate interlacing the tabs 393, 394 of adjacent flap portions 332, 338, respectively, and preventing interference between the interlacing tabs 393, 394 and the flap portions 338, 332 while folding the die-cut blank 310, respectively, notch 391 is spaced apart from the fold line 352 connected to flap portion 332 while the other interlacing notch, notch 392, is positioned proximate fold line 352 connected to flap portion 338. This configuration of having one notch positioned inward from the free edge and the other close to the free edge, offsets the two tabs from one another in the folded position as is best illustrated in FIG. 16.

With reference to FIGS. 17 and 18, the panel filter 9 includes pleated filter media 12 having a plurality of peaks and valleys formed from a polyester material. Preferably, the pleated filter media 12 is a self-supporting such that it does not require the use of an interwoven scrim or intermittent wedges. To provide the self supported pleats 13, in an embodiment, the media 12 includes fold lines that may be creased or scored and then folded there along to form the alternating peaks and valleys. Preferably the fold lines are creased. The scoring may be provided by any appropriate form of scoring in the art that does not punctures the filter media 12 such as by rotary scoring or a thermal scoring.

To increase the self-supporting nature of the media 12, the panel filter 9 includes a plurality of reinforcing strips 21 secured to the peaks of the pleats by a bead or spot of adhesive, the adhesive may include hot-melt bonding or other known adhesives. Having the reinforcing strips 21 bonded to the pleats stabilizes and supports the pleats 13 such that they do not move or compress. The reinforcing strips 21 extend substantially perpendicularly to the pleats 13 and are secured to the frame 14 at flap portions 32 and 36. The reinforcing strips 21 contact the filter media 12 on an opposite face as the grill portion 20. As such, the pleats are interposed between and adhesively secured to faces of the grill portion 20 and the reinforcing strips 21.

Although the invention is not so limited, embodiments of the panel filter 9 may have widths of between about six (6) inches and thirty (30) inches, heights of between about fifteen inches (15) and thirty (30) inches and depths of between about three-quarters (0.75) inches and six (6) inches. More preferably the panel filter 9 has a width of between about sixteen (16) inches and twenty-four (24) inches, a height of between about twenty (20) inches and twenty five (25) inches, and a depth of about two (2) inches.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A panel filter frame, comprising:
 a one-piece die-cut blank including:
 (a) a rectangular face panel having four sides;
 (b) four sidewall panels, each sidewall panel connected to one of the four sides along first fold lines;
 (c) four flaps, each flap connected to one of the sidewall panels along second fold lines, each flap having a terminating edge on an opposite side as the second fold line; and
 (d) at least one of the flaps having a corner lock structure formed in an end portion of the at least one flap arranged to mechanically interlock the at least one flap with another adjacent flap when the one-piece die-cut blank is folded along the fold lines such that the end portion of the at least one flap and an end portion of the adjacent flap overlap and engage each other.

2. The panel filter frame of claim 1, wherein the corner lock structure is a slit cut in the at least one flap, the slit slidingly receiving the terminating edge of the end portion of the adjacent flap when the one piece die-cut blank is in a folded condition.

3. The panel filter frame of claim 2, wherein the flaps include a first face and a second opposite face, and when the adjacent flap is inserted into the slit, the adjacent flap is positioned in contact with a portion of both the first face of the at least one flap and the second face of the at least one flap.

4. The panel filter frame of claim 1, wherein a first of the four flaps includes two corner lock structures and a second of the four flaps further includes two corner lock structures, the first and second flaps being positioned on opposite sides of the of the rectangular face panel, and in a folded condition, one of the corner lock structures of each of the first and second flaps engages a third flap and the other of the corner lock structures of each of the first and second flaps engages the fourth flap, the third and fourth flaps being on opposite sides of the rectangular face panel.

5. The panel filter frame of claim 4, wherein the rectangular face panel forms a grill having a plurality of die-cut holes therein, and wherein the panel filter frame material has an aesthetic finished face and an unfinished adhesive receiving face.

6. The panel filter frame of claim 1, wherein the fold lines are scored, and in the folded condition, each of the sidewall panels extend in generally perpendicular relation to the face panel, to the four flaps and to each other.

7. A panel filter frame, comprising:
 a one-piece die-cut blank including:
 (a) a rectangular face panel having four sides;
 (b) four sidewall panels, each sidewall panel connected to one of the four sides along first fold lines;

(c) four flaps, each flap connected to one of the sidewall panels along second fold lines, each flap having a terminating edge on an opposite side as the second fold line;

(d) at least one of the flaps having a corner lock structure formed in an end portion of the at least one flap arranged to mechanically interlock the at least one flap with another adjacent flap when the one-piece die-cut blank is folded along the fold lines such that the end portion of the at least one flap and an end portion of the adjacent flap overlap and engage each other;

wherein the corner lock structure is a slit cut in the at least one flap, the slit slidingly receiving the terminating edge of the end portion of the adjacent flap when the one piece die-cut blank is in a folded condition; and wherein the slit begins at the terminating edge of the at least one flap and extends towards the second fold line at an angle relative to the second fold line, and in the folded condition, the slit divides the terminating edge of the adjacent flap into an exposed portion and a hidden portion.

8. A panel filter frame, comprising:
a one-piece die-cut blank including:
(a) a rectangular face panel having four sides;
(b) four sidewall panels, each sidewall panel connected to one of the four sides along first fold lines;
(c) four flaps, each flap connected to one of the sidewall panels along second fold lines, each flap having a terminating edge on an opposite side as the second fold line;
(d) at least one of the flaps having a corner lock structure formed in an end portion of the at least one flap arranged to mechanically interlock the at least one flap with another adjacent flap when the one-piece die-cut blank is folded along the fold lines such that the end portion of the at least one flap and an end portion of the adjacent flap overlap and engage each other;

wherein the corner lock structure is a slit cut in the at least one flap, the slit slidingly receiving the terminating edge of the end portion of the adjacent flap when the one piece die-cut blank is in a folded condition;

wherein the flaps include a first face and a second opposite face, and when the adjacent flap is inserted into the slit, the adjacent flap is positioned in contact with a portion of both the first face of the at least one flap and the second face of the at least one flap; and wherein the slit is a non-linear slit interposed between and free from the second fold line and the terminating edge of the at least one flap, the slit defining at least one flexible tab the adjacent flap received within the slit and between the tab and the rest of the end portion of the at least one flap.

9. A panel filter frame, comprising:
a one-piece die-cut blank including:
(a) a rectangular face panel having four sides;
(b) four sidewall panels, each sidewall panel connected to one of the four sides along first fold lines;
(c) four flaps, each flap connected to one of the sidewall panels along second fold lines, each flap having a terminating edge on an opposite side as the second fold line;
(d) at least one of the flaps having a corner lock structure formed in an end portion of the at least one flap arranged to mechanically interlock the at least one flap with another adjacent flap when the one-piece die-cut blank is folded along the fold lines such that the end portion of the at least one flap and an end portion of the adjacent flap overlap and engage each other; and wherein the corner lock structure is an aperture and the adjacent flap includes a similarly shaped tab formed in the end portion by a single continuous die-cut slit, the aperture sized and positioned with in the end portion of the at least one flap to receive the tab when in the folded condition, the tab interlocking the adjacent flaps when the tab is folded into the aperture.

10. A panel filter frame, comprising:
a one-piece die-cut blank including:
(a) a rectangular face panel having four sides;
(b) four sidewall panels, each sidewall panel connected to one of the four sides along first fold lines;
(c) four flaps, each flap connected to one of the sidewall panels along second fold lines, each flap having a terminating edge on an opposite side as the second fold line;
(d) at least one of the flaps having a corner lock structure formed in an end portion of the at least one flap arranged to mechanically interlock the at least one flap with another adjacent flap when the one-piece die-cut blank is folded along the fold lines such that the end portion of the at least one flap and an end portion of the adjacent flap overlap and engage each other; and wherein each of the flaps include corner lock structures proximate opposed ends of each flap, the corner lock structures being a notch in the end portion of the flaps and the end portions further including a tab partially defining the notch, wherein all of the tabs extend in a substantially parallel direction, and the corner lock structures of adjacent ends of adjacent flaps engage one another, such that one edge of each of adjacent notches substantially align in the folded condition and the interconnected tabs extend away from each other in substantially parallel relation.

11. A panel filter frame comprising:
a one-piece die-cut blank of material including:
(a) a rectangular main panel;
(b) a first foldable panel connected to a first side of the main panel, a second foldable panel connected to a second opposite side of the main panel, a third foldable panel connected to a third side of the main panel, a fourth foldable panel connected to a fourth side of the main panel, the first and second foldable panels being on opposite sides of the main panel and the third and fourth foldable panels being adjacent to the first and second foldable panels and on the opposite sides of the main panel, each foldable panel including a sidewall portion connected to a terminating flap portion at a first fold line, the terminating flap portions defining free edges extending substantially parallel to the first fold lines;
(c) the foldable panels connected to their respective sides of the main panel at second fold lines extending parallel to the respective sides of the main panel and the first fold lines;
(d) the terminating flap portions substantially defining the outermost boundaries of the die-cut blank;
(e) when the die-cut blank is in a folded condition, the terminating flap portions being generally parallel to and spaced apart from the main panel, and the sidewall portions extending substantially perpendicularly between the main panel and the terminating flap portions; and (f) at least one terminating flap portion including an engagement receptacle formed in an overlapping end portion thereof for engaging an overlapping end portion of an adjacent one of the terminating flap portions.

12. A panel filter frame comprising:

a one-piece die-cut blank of material including:

(a) a rectangular main panel;

(b) a first foldable panel connected to a first side of the main panel, a second foldable panel connected to a second opposite side of the main panel, a third foldable panel connected to a third side of the main panel, a fourth foldable panel connected to a fourth side of the main panel, the first and second foldable panels being on opposite sides of the main panel and the third and fourth foldable panels being adjacent to the first and second foldable panels and on the opposite sides of the main panel, each foldable panel including a sidewall portion connected to a terminating flap portion at a first fold line, the terminating flap portions defining free edges extending substantially parallel to the first fold lines;

(c) the foldable panels connected to their respective sides of the main panel at second fold lines extending parallel to the respective sides of the main panel and the first fold lines;

(d) the terminating flap portions substantially defining the outermost boundaries of the die-cut blank;

(e) when the die-cut blank is in a folded condition, the terminating flap portions being generally parallel to and spaced apart from the main panel, and the sidewall portions extending substantially perpendicularly between the main panel and the terminating flap portions;

(f) at least one terminating flap portion including an engagement receptacle in an overlapping end portion thereof for engaging an overlapping end portion of an adjacent one of the terminating flap portions; and wherein the engagement receptacle is an angled slit that extends from the free edge of the at least one terminating flap portion at an trajectory of between about twenty five degrees and seventy-five degrees relative to the free edge, the slit receiving a free edge of the adjacent terminating flap portion when the die-cut blank is in the folded condition.

13. A panel filter frame comprising:

a one-piece die-cut blank of material including:

(a) a rectangular main panel;

(b) a first foldable panel connected to a first side of the main panel, a second foldable panel connected to a second opposite side of the main panel, a third foldable panel connected to a third side of the main panel, a fourth foldable panel connected to a fourth side of the main panel, the first and second foldable panels being on opposite sides of the main panel and the third and fourth foldable panels being adjacent to the first and second foldable panels and on the opposite sides of the main panel, each foldable panel including a sidewall portion connected to a terminating flap portion at a first fold line, the terminating flap portions defining free edges extending substantially parallel to the first fold lines;

(c) the foldable panels connected to their respective sides of the main panel at second fold lines extending parallel to the respective sides of the main panel and the first fold lines;

(d) the terminating flap portions substantially defining the outermost boundaries of the die-cut blank;

(e) when the die-cut blank is in a folded condition, the terminating flap portions being generally parallel to and spaced apart from the main panel, and the sidewall portions extending substantially perpendicularly between the main panel and the terminating flap portions;

(f) at least one terminating flap portion including an engagement receptacle in an overlapping end portion thereof for engaging an overlapping end portion of an adjacent one of the terminating flap portions; and wherein the engagement receptacle is a flexible tab defined by a non-linear slit interposed between the free edge and the corresponding first fold line of the at least one terminating flap portion, in the folded condition, the free edge of the adjacent terminating flap portion is received between the flexible tab and the overlapping end portion of the at least one terminating flap portion providing the flexible tab.

14. The panel filter frame of claim 13, wherein the non-linear slit includes a bisecting slit dividing the flexible tab into two tabs.

15. A panel filter frame comprising:

a one-piece die-cut blank of material including:

(a) a rectangular main panel;

(b) a first foldable panel connected to a first side of the main panel, a second foldable panel connected to a second opposite side of the main panel, a third foldable panel connected to a third side of the main panel, a fourth foldable panel connected to a fourth side of the main panel, the first and second foldable panels being on opposite sides of the main panel and the third and fourth foldable panels being adjacent to the first and second foldable panels and on the opposite sides of the main panel, each foldable panel including a sidewall portion connected to a terminating flap portion at a first fold line, the terminating flap portions defining free edges extending substantially parallel to the first fold lines;

(c) the foldable panels connected to their respective sides of the main panel at second fold lines extending parallel to the respective sides of the main panel and the first fold lines;

(d) the terminating flap portions substantially defining the outermost boundaries of the die-cut blank;

(e) when the die-cut blank is in a folded condition, the terminating flap portions being generally parallel to and spaced apart from the main panel, and the sidewall portions extending substantially perpendicularly between the main panel and the terminating flap portions;

(f) at least one terminating flap portion including an engagement receptacle in an overlapping end portion thereof for engaging an overlapping end portion of an adjacent one of the terminating flap portions; and wherein the engagement receptacle is an aperture formed in the overlapping end portion of the at least one terminating flap portion, and wherein the adjacent terminating flap portion includes a similarly shaped foldable tab formed by a slit, the tab being folded into the aperture when the die-cut blank is secured in a folded condition.

16. A panel filter frame comprising:
a one-piece die-cut blank of material including:
(a) a rectangular main panel;
(b) a first foldable panel connected to a first side of the main panel, a second foldable panel connected to a second opposite side of the main panel, a third foldable panel connected to a third side of the main panel, a fourth foldable panel connected to a fourth side of the main panel, the first and second foldable panels being on opposite sides of the main panel and the third and fourth foldable panels being adjacent to the first and second foldable panels and on the opposite sides of the main panel, each foldable panel including a sidewall portion connected to a terminating flap portion at a first fold line, the terminating flap portions defining free edges extending substantially parallel to the first fold lines;
(c) the foldable panels connected to their respective sides of the main panel at second fold lines extending parallel to the respective sides of the main panel and the first fold lines;
(d) the terminating flap portions substantially defining the outermost boundaries of the die-cut blank;
(e) when the die-cut blank is in a folded condition, the terminating flap portions being generally parallel to and spaced apart from the main panel, and the sidewall portions extending substantially perpendicularly between the main panel and the terminating flap portions;
(f) at least one terminating flap portion including an engagement receptacle in an overlapping end portion thereof for engaging an overlapping end portion of an adjacent one of the terminating flap portions; and
wherein adjacent terminating flap portions include similar engagement receptacles, the engagement receptacles being notches in the overlapping end portion of the terminating flap portions, the notches defining tabs in the overlapping end portions of all tabs extending in substantially parallel relation, and wherein the tab of one adjacent terminating flap portion is positioned such that the tab is positioned between the tab and first fold line of the adjacent flap portion in the folded condition and an edge of each of the notches of the adjacent engagement receptacles generally align in the folded condition.

17. A panel filter comprising:
a generally rectangular sheet of pleated filter media;
a one-piece die-cut sheet of material folded into a frame including:
(a) a rectangular grill having four sides and a plurality of holes defined by webbing;
(b) four sidewall panels, each sidewall panel connected to one of the four sides at first folds;
(c) four flaps, each flap connected to one of the sidewall panels at second folds, each flap having a terminating edge on an opposite side as the second fold;
(d) at least one of the flaps having a corner lock structure formed in an end portion of the at least one flap for mechanically interlocking the at least one flap with another adjacent flap when the one-piece die-cut sheet is folded along the folds, the end portion of the at least one flap overlaps and engages an end portion of the adjacent flap;
the grill, flaps and panels defining a continuous channel when folded, the channel receiving edges of the filter media; and
the filter media being adhesively secured within the frame and a plurality of the peaks of the pleats being adhesively bonded to a face of the webbing.

18. The panel filter of claim 17, wherein the pleated filter media is self supported without wedges or a scrim, and further comprising support strips running between opposed sides of the frame and on a face of the filter media opposite of the grill, and wherein the strips are adhesively bonded to a plurality of the peaks of the pleats.

19. The panel filter of claim 17, wherein the corner lock structure is an aperture formed in the end portion of the at least one flap, the end portion of the adjacent flap including a foldable tab foldably received within the aperture and interlocking the adjacent flaps.

20. A panel filter comprising:
a generally rectangular sheet of pleated filter media;
a one-piece die-cut sheet of material folded into a frame including:
(a) a rectangular grill having four sides and a plurality of holes defined by webbing;
(b) four sidewall panels, each sidewall panel connected to one of the four sides at first folds;
(c) four flaps, each flap connected to one of the sidewall panels at second folds, each flap having a terminating edge on an opposite side as the second fold;
(d) at least one of the flaps having a corner lock structure formed in an end portion of the at least one flap for mechanically interlocking the at least one flap with another adjacent flap when the one-piece die-cut sheet is folded along the folds, the end portion of the at least one flap overlaps and engages an end portion of the adjacent flap;
the grill, flaps and panels defining a continuous channel when folded, the channel receiving edges of the filter media;
the filter media being adhesively secured within the frame and a plurality of the peaks of the pleats being adhesively bonded to a face of the webbing; and
wherein the corner lock structure is a slit formed in the at least one flap, the slit extending at an angle from the terminating edge of the at least one flap, the terminating edge being substantially parallel to the second fold line connecting the flap to a respective sidewall panel, the slit receiving an end portion of an adjacent flap thereby interconnecting the adjacent flaps in a folded position.

21. A panel filter comprising:
a generally rectangular sheet of pleated filter media;
a one-piece die-cut sheet of material folded into a frame including:
(a) a rectangular grill having four sides and a plurality of holes defined by webbing;
(b) four sidewall panels, each sidewall panel connected to one of the four sides at first folds;
(c) four flaps, each flap connected to one of the sidewall panels at second folds, each flap having a terminating edge on an opposite side as the second fold;
(d) at least one of the flaps having a corner lock structure formed in an end portion of the at least one flap for mechanically interlocking the at least one flap with another adjacent flap when the one-piece die-cut sheet is folded along the folds, the end portion of the at least one flap overlaps and engages an end portion of the adjacent flap;
the grill, flaps and panels defining a continuous channel when folded, the channel receiving edges of the filter media;

the filter media being adhesively secured within the frame and a plurality of the peaks of the pleats being adhesively bonded to a face of the webbing; and wherein the corner lock structure is a slit formed in the end portion of the at least one flap, the slit forming a flexible tab interposed between the terminating edge of the at least one flap and the second fold line connecting the at least one flap to a respective sidewall panel, the end portion of the adjacent flap being positioned between a flexible tab and the end portion of the at least one flap, thereby interconnecting the adjacent flaps in a folded position.

22. A panel filter comprising:

a generally rectangular sheet of pleated filter media;

a one-piece die-cut sheet of material folded into a frame including:
  (a) a rectangular grill having four sides and a plurality of holes defined by webbing;
  (b) four sidewall panels, each sidewall panel connected to one of the four sides at first folds;
  (c) four flaps, each flap connected to one of the sidewall panels at second folds, each flap having a terminating edge on an opposite side as the second fold;
  (d) at least one of the flaps having a corner lock structure formed in an end portion of the at least one flap for mechanically interlocking the at least one flap with another adjacent flap when the one-piece die-cut sheet is folded along the folds, the end portion of the at least one flap overlaps and engages an end portion of the adjacent flap;

the grill, flaps and panels defining a continuous channel when folded, the channel receiving edges of the filter media;

the filter media being adhesively secured within the frame and a plurality of the peaks of the pleats being adhesively bonded to a face of the webbing; and wherein the corner lock structure is a notch in the end portion of the at least one flap, the notch defining a tab in the end position, the adjacent flap portion including a similar notch and tab in the end portion thereof, the notches of the adjacent flaps interlacing such that the tabs of the adjacent flaps are parallel and extend away from each other in a folded condition.

* * * * *